United States Patent [19]

Ingebright

[11] Patent Number: 4,700,379
[45] Date of Patent: Oct. 13, 1987

[54] AIRCRAFT COMMUNICATIONS APPARATUS

[75] Inventor: David E. Ingebright, Seattle, Wash.
[73] Assignee: The Boeing Company, Seattle, Wash.
[21] Appl. No.: 810,241
[22] Filed: Dec. 18, 1985
[51] Int. Cl.⁴ .............................................. H04M 9/00
[52] U.S. Cl. ..................... 379/167; 379/171; 379/442
[58] Field of Search ............ 179/37, 2 C, 81 R, 27 G; 455/602; 379/167, 171, 160, 442

[56] References Cited

U.S. PATENT DOCUMENTS

| | | | |
|---|---|---|---|
| 3,213,391 | 10/1965 | Kovalevski et al. | 250/208 |
| 3,385,970 | 5/1968 | Coffin, Jr. et al. | 455/602 |
| 3,410,961 | 11/1968 | Slana | 455/602 |
| 3,825,896 | 7/1974 | Obenhaus | 340/147 R |
| 3,888,772 | 6/1975 | Neuner | 250/199 |
| 3,999,015 | 12/1976 | Snyder et al. | 179/37 |
| 4,046,959 | 9/1977 | Watanabe et al. | 455/602 |
| 4,055,729 | 10/1977 | Vondling | 179/2 C |
| 4,056,719 | 11/1977 | Waaben | 250/199 |
| 4,178,504 | 12/1979 | Farmer | 250/199 |
| 4,190,747 | 2/1980 | Feiner et al. | 250/199 |
| 4,203,006 | 5/1980 | Mascia | 179/2 C |
| 4,225,752 | 9/1980 | Looschen | 370/1 |
| 4,228,323 | 10/1980 | Feiner et al. | 250/551 |
| 4,282,604 | 8/1981 | Jefferson | 455/602 |
| 4,298,839 | 11/1981 | Johnston | 324/157 |
| 4,310,754 | 1/1982 | Check, Jr. | 235/454 |
| 4,313,225 | 1/1982 | Carbrey et al. | 455/602 |
| 4,420,841 | 12/1983 | Dudash | 455/607 |
| 4,485,273 | 11/1984 | Bortelink | 379/167 X |
| 4,503,532 | 3/1985 | Page | 179/37 |
| 4,538,031 | 8/1985 | Benning et al. | 179/81 B |
| 4,578,540 | 3/1986 | Borg et al. | 179/81 R X |
| 4,591,663 | 5/1986 | Sullivan | 179/2 C |

FOREIGN PATENT DOCUMENTS

| | | | |
|---|---|---|---|
| 91562A | 10/1983 | European Pat. Off. | |
| 0091057 | 6/1982 | Japan | 455/602 |
| 57-91057 | 7/1982 | Japan | |
| 0061262 | 4/1984 | Japan | 379/167 |
| 1051296 | 3/1986 | Japan | 455/602 |

OTHER PUBLICATIONS

IBM Technical Disclosure Bulletin, vol. 22, No. 4, "Bi-directional Optical Isolator" by Judd et al. (Sep. 1979).

*Primary Examiner*—Gene Z. Rubinson
*Assistant Examiner*—Matthew E. Connors
*Attorney, Agent, or Firm*—Finnegan, Henderson, Farabow, Garrett & Dunner

[57] ABSTRACT

Aircraft communications apparatus includes a permanent communications system, a temporary communications system and an interface coupler connecting the permanent and temporary communications systems. The coupler consists of a plurality of opto-isolator circuits each of which couples signals between one of the permanent communications and one of the temporary communications circuits thereby reducing the transmission of noise between the circuits. The coupler further includes a plurality of normally-closed bypass relays each connected in parallel with one of the opto-isolator circuits which are controlled by manually-operated switches to bypass the opto-isolator circuits in the event of a malfunction.

7 Claims, 3 Drawing Figures

AIRCRAFT COMMUNICATIONS APPARATUS

BACKGROUND OF THE INVENTION

The present invention relates to aircraft communications apparatus, and finds particular utility in providing an improved communications system including a temporary flight test communications system and a permanent communications system of an aircraft.

During flight tests on a new type of aircraft, it is necessary to employ a temporary communications system to permit communication between the flight test engineers and the pilot. Temporary communications systems installed on test aircraft in the past have created problems in that such systems were susceptible to interference, noise, static, and other undesired signals, thus interfering with communications between the pilot and flight test engineers. Moreover, since previous temporary communications systems have been hardwired to the permanent system, noise or malfunction in the temporary system could not only disrupt communication between the pilot and flight test personnel, but could be introduced to the permanent communications system such as to cause interference with the pilot's ability to communicate with air traffic control and subject the permanent communications system to damage. However, although degradation of the total communications system within the aircraft by the temporary system is undesirable, it is essential that communication between functions for flight test personnel be maintained if at all possible.

It is therefore an object of the present invention to provide an aircraft communications apparatus which will provide a more reliable temporary flight test communications system which will create less interference with the permanent communications system.

It is a further object of the present invention to provide an aircraft communications apparatus which will minimize the effect on communication between a pilot and the flight test engineers of a malfunction in the temporary flight test communications system.

SUMMARY OF THE INVENTION

To achieve these and other objects, and in accordance with the purposes of the invention as embodied and broadly described herein, aircraft communications apparatus is provided comprising a first communications system having a first plurality of communications circuits, at least one set of audio transducers, and at least one first audio select panel. The aircraft communications apparatus further comprises a second communications system having a second plurality of communications circuits, at least one set of second audio tranducers, and at least one second audio select panel. The apparatus further comprises an interface coupler connecting the first and second communications systems. The coupler comprises a plurality of coupling means for coupling signals between one of the first communications circuits and one of the second communications circuits, and a plurality of protective devices each connected in parallel with one of the coupling means and selectively operable between an open circuit condition and a closed circuit condition.

The accompanying drawings, which are incorporated in and constitute a part of the specification, illustrate a preferred embodiment of the invention and, together with the general description given below, serve to explain the principles of the invention.

DESCRIPTION OF THE PREFERRED EMBODIMENTS

Figure 1:
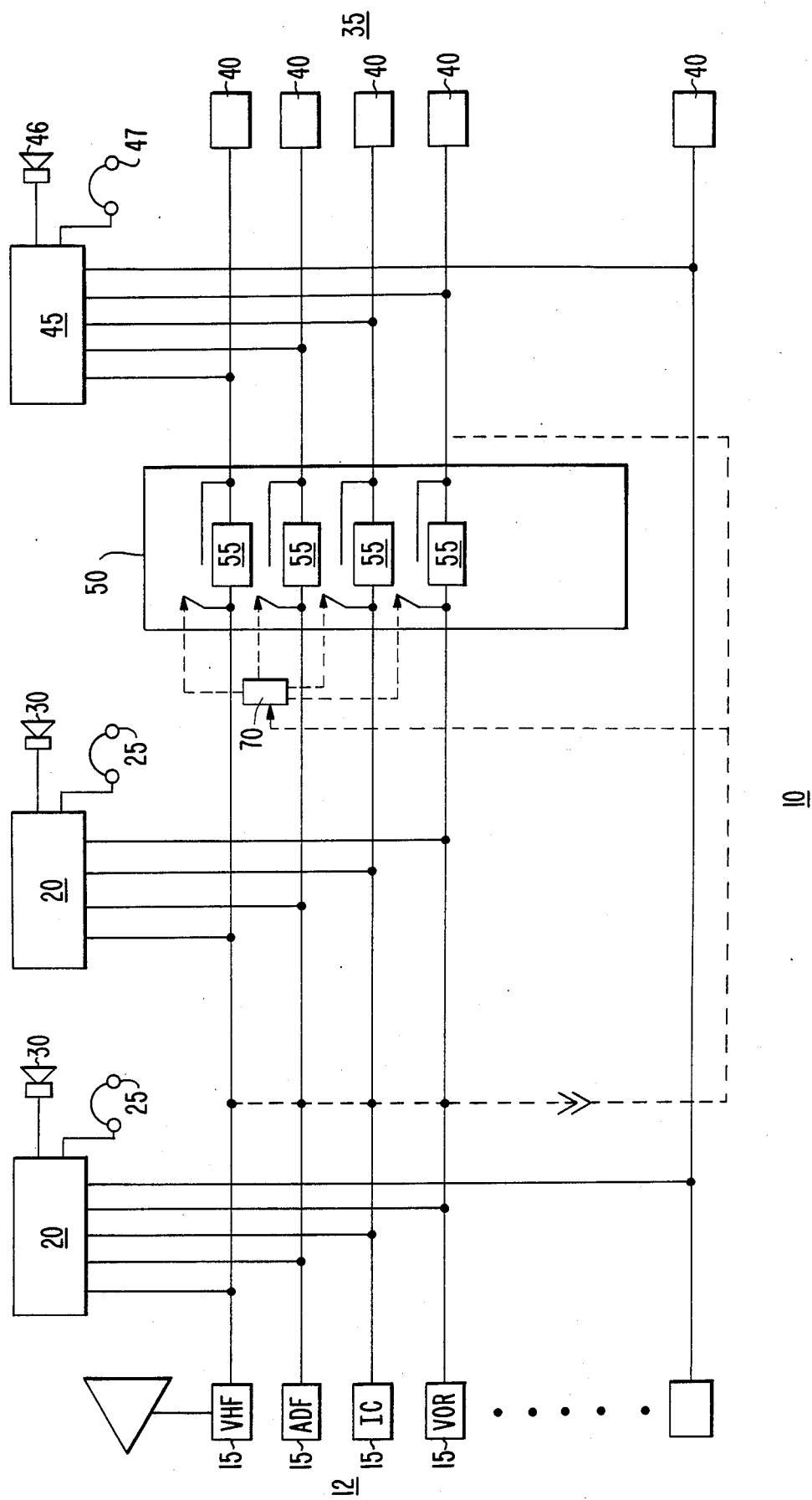
FIG. 1 is a block diagram illustrating an aircraft communications apparatus in accordance with a preferred embodiment of the present invention.

Reference will now be made in detail to the present preferred embodiment of the invention, examples of which are illustrated in the accompanying drawings in which like reference characters refer to like elements.

An aircraft communications apparatus which constitutes a preferred embodiment of the invention is shown in FIG. 1 and is represented generally by the numeral 10. Apparatus 10 includes a plurality of permanent communications circuits 15 which may include VHF communication transceivers (VHF), HF communications transceivers, intercom to flight attendants (IC), and navigation receivers such as VORTAC and automatic direction finder (ADF). Communications circuits 15 are installed behind walls and below floors when the aircraft is manufactured, and are connected to audio selector panels 20 to permit selective connection of one or more of permanent communications circuits 15 to an associated audio transducer such as a headphone 25 and a microphone 30. For example, microphone 30 can be switched by audio selector panel 20 to transmit over any one of the transmitting circuits of transceivers associated with communications circuits 15 or over the intercom.

Apparatus 10 also includes a temporary communications system 35 removably installed in the airplane after manufacture to provide communications for flight test engineers engaged in testing procedures required for certification of new and modified types of aircraft prior to sale. System 35 has a plurality of temporary communications circuits 40 to which are connected audio selector panels 45 similar in function to audio selector panels 20. Audio selector panels 45 also are connected to sets of audio transducers such as microphone 46 and headphone 47. Although only two audio selector panels 20 and one audio selector panel 45 are shown in FIG. 1, it is to be understood that any number of panels 20 and 45 may be provided, depending on the application.

Apparatus 10 further includes an interface coupler 50 which connects system 12 with system 35 and includes a plurality of coupling means for coupling signals between one of the permanent communications circuits 15 and one of the temporary communications circuits 40. As embodied herein, the coupling means consists of a plurality of opto-isolator circuits 55.

Interface coupler 50 also includes a plurality of protective devices which in the preferred embodiment comprise a plurality of bypass relays 65 controlled by a switch 70. Each relay 65 is connected in parallel with one of the opto-isolator circuits 55. Relays 65 are normally closed relays such that a power failure will cause relays 65 to automatically establish a metallic connection between system 35 and system 12. Moreover, manual operation of switch 70 is effective to close relays 65 in the event of a malfunction in interface coupler 50.

Figure 2:
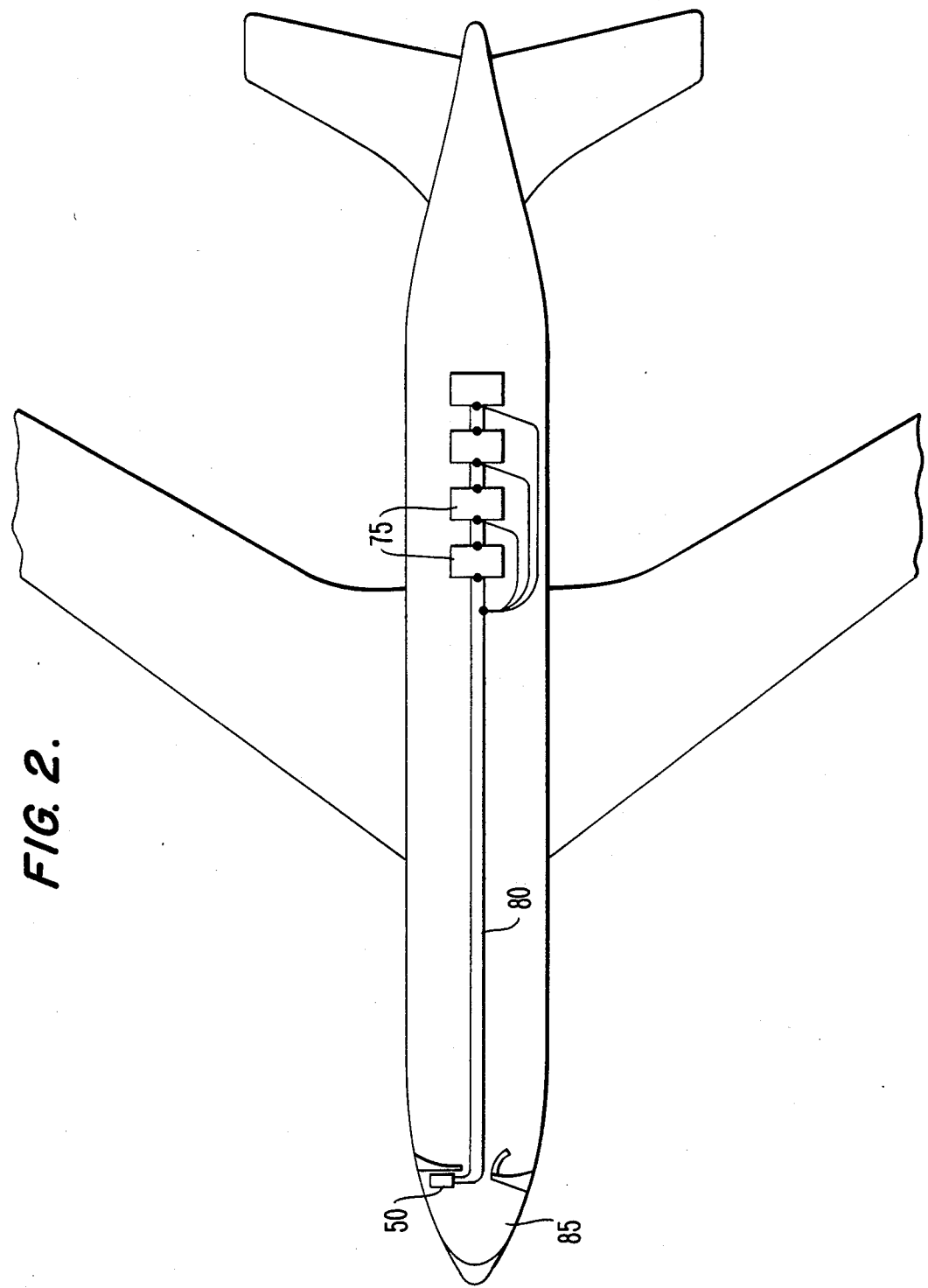
FIG. 2 illustrates a view of the interior of an aircraft showing the cables connecting the temporary flight test communications system with the permanent communications system.

FIG. 2 illustrates the manner in which the temporary flight test communications system 35 is typically connected to permanent communications system 12 in an aircraft. Flight test engineers seated at instrument panels 75 during flight tests monitor test parameters being collected by various sensors mounted throughout the aircraft. A series of cables 80 connected to audio selector panels 45 mounted on instrument panels 75 carry temporary communications circuits 40 and are laid along and on the surface of the floor of the aircraft cabin to cockpit 85 where interface coupler 50 is located.

Figure 3:
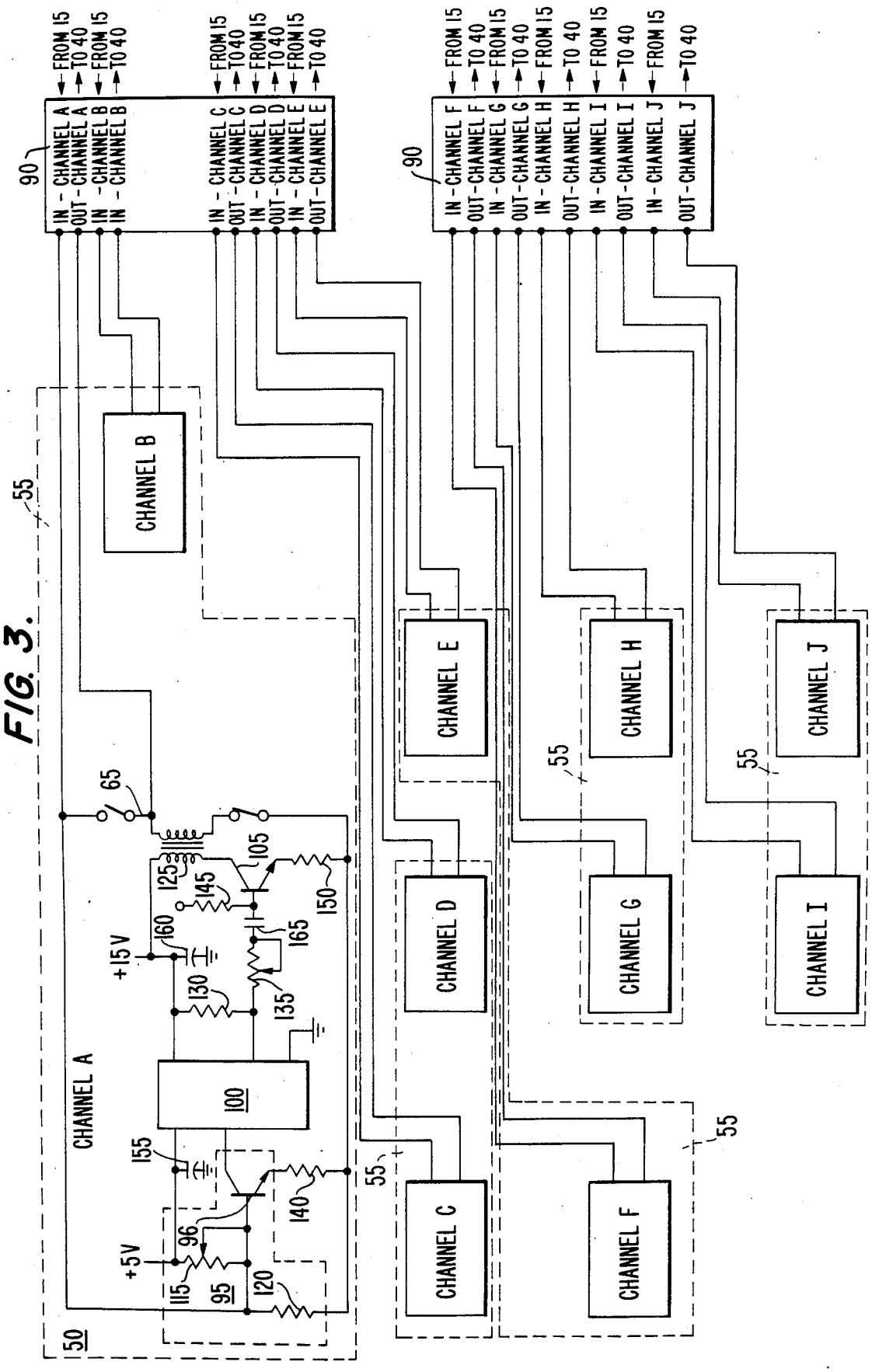
FIG. 3 is a schematic diagram of an interface coupler of the apparatus shown in FIG. 1.

The structure of a preferred embodiment of interface coupler 50 is shown in greater detail in FIG. 3. As can be seen therein, coupler 50 includes a pair of modules 90 each including five channels to form five duplex opto-isolator circuits 55. It is to be understood, however, that more or fewer opto-isolator circuits could be provided, dependent upon the number of temporary communications circuits 40 included in system 35.

Each channel of an opto-isolator circuit 55 includes an input bias stage 95 connected to a communications circuit 15 or 40, connected to a communications circuit 15 or 40, an opto-coupler integrated circuit 100, such as a Hewlett Packard HCPL-2530, an output driver transistor 105, and an impedance matching transformer 125, the output of which is connected to a communications circuit 40 or 15, corresponding to the communications circuit 15 or 40 connected to input bias stage 95. Input bias stage 95 includes a biasing transistor 96, which in the preferred embodiment comprises a type 2N3904, biased with a voltage divider consisting of resistors 115 and 120. Output driver transistor 105 in the preferred embodiment consists of a 2N3054 type transistor. Transformer 125 converts the high impedance of output driver transistor 105 to the 600 ohm impedance required by communications circuits 15 and 40. The bias is provided to ensure that the LED of circuit 100 is operated in the linear range.

The output of circuit 100 is suppled across a resistor 130 to a level set resistor 135. Each opto-isolator circuit 55 also includes a resistor 150 and a resistor 145 which provide emitter and base bias, respectively, for output driver transistor 105. A capacitor 160 is provided for power supply decoupling to prevent the possibility of electromagnetic interference (EMI) on the power supply lines from entering the audio system. A capacitor 165 connected between resistors 130 and 145 provides interstage AC coupling between the optoisolator circuit 55 and output driver 105.

Interface coupler 50 supplies audio signals to and from communication circuits 15 and 40, and optically couples audio signals to the flight test audio selector panels 45. This allows communications between the flight test engineers and the pilot, between the pilot and the ground, and between the flight test engineers and the ground.

In the event of a short circuit in a temporary communications circuit 40, the flight test engineer is prevented from communicating with the ground, but the pilot can still do so. In the event of a power failure, bypass relays 65 automatically establish a metallic connection between system 35 and system 12. The apparatus provides the capability to accept the risk that temporary communication system 35 may introduce additional noise to permanent communication system 12 because it is important that communications between the flight test engineers and the pilot not be cut off unless absolutely necessary.

This invention minimizes problems such as noise, static, hum, ground loop problems and low audio levels in the permanent communications system commonly caused by connecting the prior art temporary flight test communications system to the permanent communications system. Problems of this type have degraded the permanent communications system to the point where flight safety has been affected. By optically isolating all connections, a much clearer and more troublefree communications system can be temporarily installed on the airplane and maximum flexibility in coupling of permanent and temporary communications systems can be maintained.

It will be apparent to those skilled in the art that various modifications and variations can be made to the aircraft communications apparatus of the present invention without departing from the scope or spirit of the invention. Thus, it is intended that the present invention cover the modifications and variations of the invention, provided they come within the scope of the appended claims and their equivalents.

What I claim is:

1. Communications apparatus for an aircraft, comprising:
    a first communications system, permanently installed in said aircraft and comprising a first plurality of communications circuits, at least one first audio select panel connected to said first plurality of communications circuits, and at least one set of first audio transducers connected to said at least one first audio select panel;
    a second communications system removably installed in said aircraft and comprising a second plurality of communications circuits, at least one second audio select panel connected to said second plurality of communications circuits, and at least one set of second audio transducers connected to said at least one second audio select panel;
    an interface coupler connecting said first and second communications systems, said coupler comprising a plurality of coupling means for coupling a signal between one of said first communications circuits and one of said second communications circuits, said coupler also comprising a plurality of protective devices, each of said protective devices being respectively connected in parallel with one of said coupling means and each of said protective devices being selectively operable between an open circuit condition and a closed circuit condition.

2. Communications apparatus for an aircraft according to claim 1, wherein the number of said first audio select panels is equal to the number of said sets of first audio transducers.

3. Communications apparatus for an aircraft according to claim 1, wherein the number of said second audio select panels is equal to the number of said sets of second audio transducers.

4. Communications apparatus for an aircraft according to claim 1, wherein said interface coupler comprises a plurality of opto-isolator circuits.

5. Communications apparatus for an aircraft according to claim 1, wherein said plurality of protective devices are normally-closed relays controlled by a manually-operated switch.

6. Communications apparatus for an aircraft according to claim 5, wherein said plurality of protective devices establish a metallic connection between said second communications system and said first communications system in the event of a malfunction of said coupling means.

7. Communications apparatus for an aircraft according to claim 4, wherein each of said plurality of opto-isolator circuits comprises an input bias stage connected to the input of said opto-isolator circuit, a transistor means, connected to the output of said opto-isolator circuit, for driving the output signal of said opto-isolator circuit, and an impedance matching device connected to the output of said transistor means.

* * * * *